United States Patent [19]
Myers et al.

[11] Patent Number: 5,099,448
[45] Date of Patent: * Mar. 24, 1992

[54] MATRIX-VECTOR MULTIPLICATION APPARATUS

[75] Inventors: Gregory K. Myers, San Francisco; Norman A. Peppers, Belmont; James R. Young, Palo Alto, all of Calif.; Kazuo Katsuki, Tokyo, Japan

[73] Assignee: Nippon Sheet Glass Co., Ltd., Osaka, Japan

[*] Notice: The portion of the term of this patent subsequent to Jun. 26, 2007 has been disclaimed.

[21] Appl. No.: 373,110

[22] Filed: Jun. 28, 1989

[51] Int. Cl.$^5$ .................. G06G 7/16; G06E 3/00
[52] U.S. Cl. .................. 364/841; 364/837; 364/713
[58] Field of Search ........... 364/713, 754, 736, 757, 364/822, 837, 841, 845; 350/162.12, 162.13, 162.14

[56] References Cited

U.S. PATENT DOCUMENTS

| | | | |
|---|---|---|---|
| 4,009,380 | 2/1977 | Bocker et al. | 364/837 |
| 4,592,004 | 5/1986 | Bocker et al. | 364/845 |
| 4,620,293 | 10/1986 | Schlunt et al. | 364/845 |
| 4,843,587 | 6/1989 | Schlunt et al. | 364/837 |
| 4,937,776 | 6/1990 | Myers et al. | 364/713 |

OTHER PUBLICATIONS

Babcock, T. R. et al., "Linear Discrimination Optical-Electronic Implementation Techniques" in *Optical Processing of Information* ed. Pollock, D. K. (date unknown circa 1963).

Goodman, J. W. et al., "Parallel Incoherent Optical Matrix Multipliers", *Workshop on Future Directions for Optical Information Processing, Final Report*, (1981).

Psaltis, D., "Computational Power and Accuracy Trade-Offs in Optical Numerical Processors"; SPIE vol. 614 (1986).

Rhodes, W. T., "Optical Matrix-Vector Processors: Basic Concepts"; SPIE vol. 614 (1986).

*Primary Examiner*—Jerry Smith
*Assistant Examiner*—Jim Trammell
*Attorney, Agent, or Firm*—Woodcock Washburn Kurtz Mackiewicz & Norris

[57] ABSTRACT

A matrix-vector multiplication apparatus for performing a matrix operation at high speed and in a wide dynamic range, i.e., high precision, wherein an input vector is displayed with radiance of pixels, a display image is replicated into many images through an optical system. Component multiplications and partial summing between rows or columns of the matrix and the input vector are simultaneously performed by a light transmissive mask having transmitance proportional to one digit value of multi-scale (three or more) matrix component and a photosensor. Parallel channels each assigned to a different digit of the matrix component calculates the partial sums and a power-of-m (m is the number of scales) scaling summer connected to the parallel channels electrically produces components of an output vector.

13 Claims, 9 Drawing Sheets

MATRIX-VECTOR MULTIPLICATION APPARATUS

BACKGROUND OF THE INVENTION

1. Field of the Invention

The present invention relates to a matrix-vector multiplication operation apparatus for multiplying an input vector by a predetermined matrix. The present invention also relates to the subject matter disclosed in U.S. Pat. No. 4,937,776.

2. Description of the Prior Art

A large number of multiplication are required in a matrix operation. It therefore takes a long period of time to perform a matrix operation by a digital computer of a sequential processing system. For example, even if one multiplication requires a very short time of 100 ns, a time of 1 ms is required for a multiplication between matrix having 100 rows and vector having 100 columns.

A pipelined array processor is arranged in a computer which deals with scientific calculations. However, such a matrix-vector calculation is certainly poor in digital computation techniques in general.

There is proposed an optical-based parallel processing matrix-vector calculation apparatus, as shown in FIG. 13. In this apparatus, an input vector is displayed on a one-dimensional LED array 11. Values of the components of the input vector correspond to brightness levels of LEDs 12 constituting the array. Light from each LED 12 is scattered by a columnar lens 13 in one direction, and the scattered light is projected on a mask array 14.

Each mask 15 constituting the mask array 14 corresponds to each component of a matrix used for an operation with an input vector. The area of a light transmission opening of each mask corresponds to the value of each component. Light passing through the mask array 14 is focused by a columnar lens 16 aligned in a direction perpendicular to that of the columnar lens 13 and is incident on a photosensor array 17.

An input vector is multiplied with a row or column of a matrix by means of input vector radiant from the LED array 11 and light transmission factors of the mask array 14. A partial sum of products in units of rows or columns can be obtained upon detection of light by photosensors 18 constituting the photosensor array 17. Therefore, an output from each photosensor 18 represents a component of an output vector.

When the number of matrix components is increased, a distance between the columnar 13 and the mask array 14 and a distance between the columnar lens 16 and the mask array 14 must be increased due to increase of optical channels. However, when the distances are increased, crosstalk occurs in components of the input and output vectors.

For this reason, the mask array 14 is often constituted by a spatial light modulation device so as to dynamically change a light transmittance of each mask 15 during the operation, i.e., so as to reduce optical channels with time-divisional matrix-vector operation.

In the operation apparatus shown in FIG. 13, the light transmission opening amount (area) or transparency of each mask 15 constituting the mask array 14 represents a component value of the matrix. Therefore, operation precision is limited by geometric precision of the mask 15. More specifically, the dynamic range of the matrix components serving as operands is very narrow, and an S/N ratio of the operation results is very low, thus degrading the precision.

When a spatial light modulation device is used, it takes a period of time on the order of ms to drive the spatial light modulation device. In addition, an input vector display and calculations for the sum of products must be performed every modulation cycle. In the conventional arrangement shown in FIG. 13, the matrix operation is not always performed at high speed although optical parallel processing is executed.

Furthermore, structures such as a control circuit is required for the spatial light modulation device, and the device cannot be easily made compact.

SUMMARY OF THE INVENTION

It is an object of the present invention to obtain high-precision matrix-vector multiplication results with improvement of a dynamic range of calculations limited by geometric precision of a mask pattern.

It is another object of the present invention to improve a level of a light signal passing through an optical parallel processing channel and hence to obtain an operation output having a high S/N ratio and a wide dynamic range.

It is still another object of the present invention to provide a large-capacity, high-speed operation apparatus which can handle a large matrix having a very large number of components (e.g., 96×6125) and perfectly executing parallel processing of the components multiplications and the partial sum in the entire matrix.

It is still another object of the present invention to provide a compact, high-speed operation apparatus wherein the size of an optical system can be reduced while crosstalk between parallel processing channels can be reduced, and therefore parallel processing of components of a large matrix can be simultaneously performed by a single mask pattern.

It is still another object of the present invention to easily manufacture a large-capacity, high-density mask pattern representing matrix components with high precision.

A matrix-vector multiplication apparatus of the present invention comprises parallel operation units each assigned to each digit of a multi-scale, multi-digit code representing a component of a matrix, and summing means for combining outputs from said parallel operation units.

Each of the parallel operation units includes a display for displaying a plurality of components constituting an input vector produce a radiant image pattern; a replication optical system for optically replicating a vector image displayed on the display into multiple images, the number of which corresponds to the number of rows or columns of the matrix; a mask array comprising multi-level transmission elements each having transmittance proportional to one digit value of each matrix component, the transmission elements producing products between the components of the vector and the matrix when the vector image radiance passes through the mask array; and photosensors each of which is arranged to detect an intensity of light of each replicated vector image having passed through the mask array and sums up the products to produce one digit value of a multiplication operation.

The summing means produces a digit-weighted sum of all digits outputs from the operation units to produce a component of an output vector.

In the matrix operation apparatus according to the present invention, the image of an input vector X is replicated by the corresponding number of rows or columns of a matrix M to be multiplied with the input vector X. The calculations between the replicated images of the vector X and the rows or columns of the matrix M can be processed parallelly in all rows or columns. In addition, the image of the vector X is optically replicated by the replication optical system, so that the replicated vector images can be simultaneously obtained.

Light corresponding to a component $X_j$ of the image of the vector X is transmitted through the mask array, and an intensity of light (corresponding to this image) passing through the mask array is modulated and detected by the corresponding photosensor. Therefore, the calculations for the sum of products between the vector X and the rows or columns of the matrix M can be simultaneously performed.

Calculations are performed in individual operation units corresponding to different digits of the multi-scale, multi-digit code representing matrix. Therefore, although calculations for the sum of products are performed on an analog level, the dynamic range of the operation is wide, and errors and noise can be reduced.

In order to perform parallel processing between the vector and the rows and columns of the matrix, the vector image is replicated. Upon replication, light rays from the image are not simply scattered so that crosstalk between the vector components is very small even if the number of replicated images is very large. As a result, when the number of rows or columns of the matrix M subjected to calculations with the vector is large, a mask array including all the components of the matrix can be arranged in a single two-dimensional array. Therefore, transmittance of each mask need not be dynamically updated.

These and other objects of the invention will be seen by reference to the description, taken in connection with the accompanying drawings.

DETAILED DESCRIPTION OF THE PREFERRED EMBODIMENT

A matrix operation apparatus applied to a vector-matrix multiplication in 3-digit, hexadecimal-scale precision according to an embodiment of the present invention will be described with reference to FIGS. 1 to 12.

The following matrix operation is performed to obtain an output vector Y from an input vector X and a matrix M:

$$Y = M \cdot X \ldots \quad (1)$$

One component $M_{ij}$ of the matrix is represented by an 3-digit code weighted with $16^0$ to $16^{-2}$.

$$M_{ij} = \sum_{b=0} M_{ij}^b 16^{-b} \quad (2)$$

If matrix operation results in units of digits are given as:

$$S_i^b = \sum_j M_{ij}^b X_j \quad (3)$$

then one element of the matrix operation result can be obtained as a power-of-16 weighted sum of three digits as follows:

$$\begin{aligned} Y_i &= \sum_j M_{ij} X_j \\ &= \sum_j \sum_{jb=0}^{2} M_{ij}^b 16^{-b} X_j \\ &= \sum_{b=0}^{2} 16^{-b} S_i^b \end{aligned} \quad (4)$$

Figure 1:
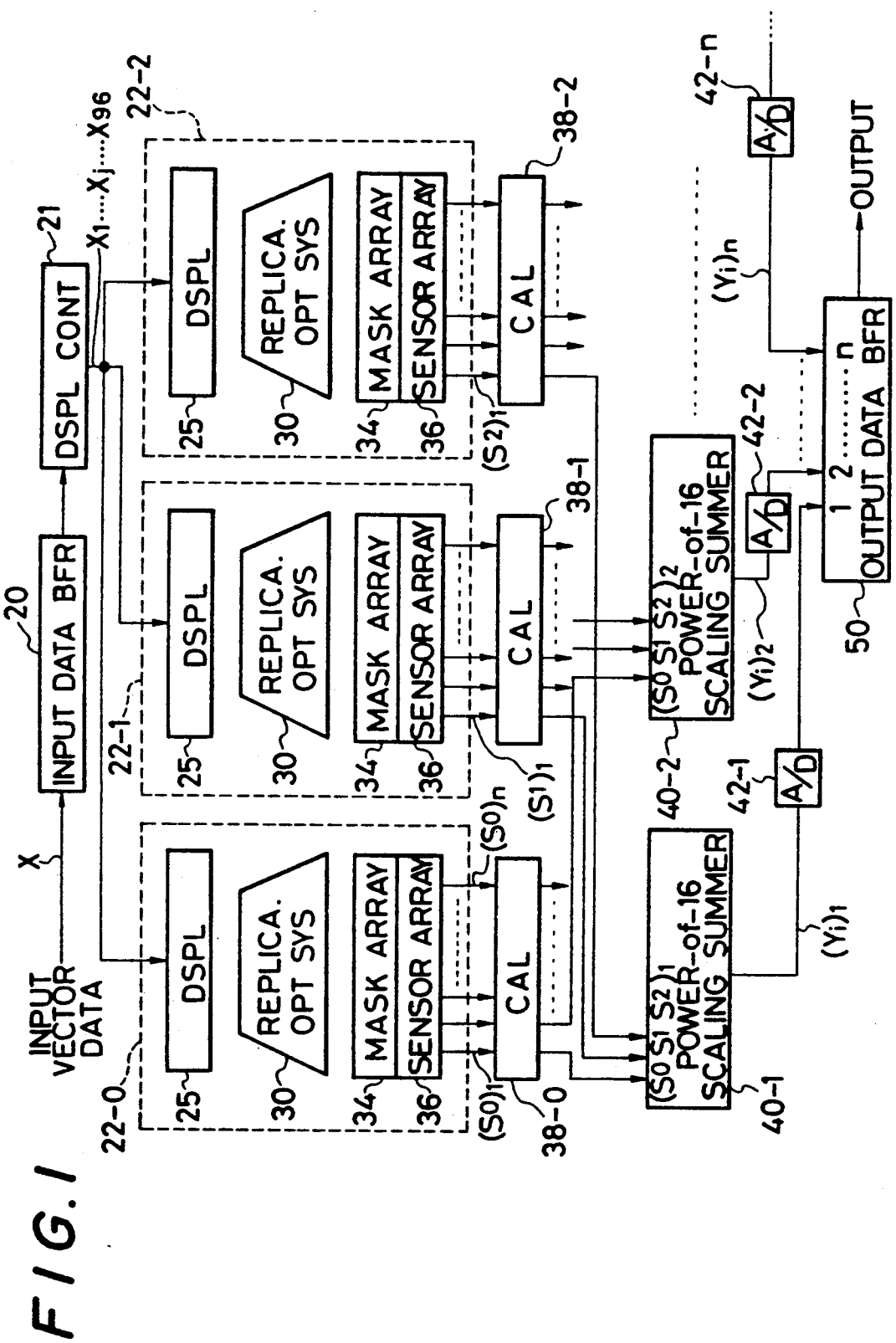
FIG. 1 is a block diagram of a matrix-vector multiplication apparatus according to an embodiment of the present invention.

In this embodiment, as shown in FIG. 1, three operation units 22-0 to 22-2 are arranged to obtain the values $S^b{}_1$.

In this embodiment, the number of components of the input vector X is 96, and values of the individual components $X_j$ (j=1 to 96) are linear analog values or discrete multivalues with gray scale having e.g., 1 to 256 levels. The number of components of the matrix M is, e.g., 6125×96 ($M_{ij}$, i=1 to 6125 and j=1 to 96). Therefore, $$\begin{bmatrix} Y_1 \\ \cdot \\ \cdot \\ \cdot \\ Y_i \\ \cdot \\ \cdot \\ \cdot \\ Y_{6125} \end{bmatrix} = \begin{bmatrix} M_{11} & M_{12} & \ldots & M_{1,96} \\ M_{21} & M_{22} & & \cdot \\ \cdot & & \ddots & \cdot \\ \cdot & & M_{ij} & \cdot \\ \cdot & & & \cdot \\ M_{6125,1} & & \ldots & M_{6125,96} \end{bmatrix} \cdot \begin{bmatrix} X_1 \\ \cdot \\ \cdot \\ \cdot \\ X_j \\ \cdot \\ \cdot \\ \cdot \\ X_{96} \end{bmatrix}$$

The above matrix operation is performed every 0th to 2nd digits of each component $M_{ij}$, and an operation output $Y_i$ (i=1 to 6125) consisting of 6125 components can be obtained.

Figure 2:
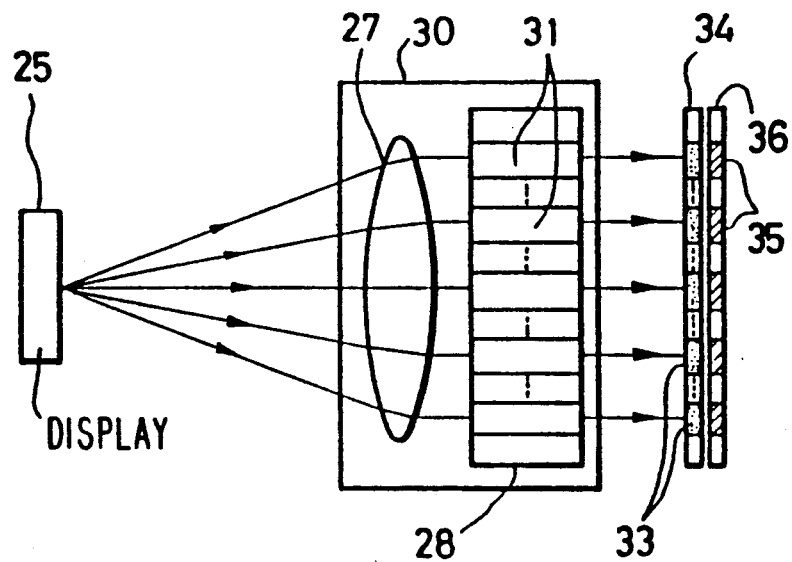
FIG. 2 is a schematic diagram showing an optical path of an optical unit in the embodiment of FIG. 1.

Referring to FIG. 1, three identical input vectors are transmitted parallely to the operation units 20-0 to 22-2 through an input data buffer 20 and a display controller 21. Each of the operation units 22-0 to 22-2 comprises a display 25, a replication optical system 30, a mask array 34, and a sensor array 36, as shown in FIGS. 1 and 2.

The display 25 displays values of the respective components ($X_1$ to $X_{96}$) of the input vector by intensity-modulation of radiant of display pixels. The replication optical system 30 replicates an image of the display 25 by a microlens array or the like and projects 6125 parallel replicated vector images the number of which correspond to the row components i (i=1 to 6125) of the matrix M on a mask array 34.

The mask array 34 has transmissive mask elements having transmittance proportional to hexadecimal sale of the components $M_{ij}$ (i=1 to 6125 and j=1 to 96) of the matrix M. The 6125 parallel replicated images of the display 25 through the replication optical system 30 are projected on the mask array 34 in units of rows. When the vector image light rays pass through the mask array 34, products ($M_{ij} \times X_j$) of the components of the vector X and the matrix M are calculated parallelly in all rows (i).

Transmitted outputs from the mask array 34 are photoelectrically converted by the sensor array 36. The sensor array 36 has 6125 light-receiving elements each corresponding to the row of the mask array 34. The respective light-receiving elements calculate an analog $$\text{sum} \sum_{j=1}^{96} M_{ij}X_j$$

by integrating the amounts of transmitted light, that is, the respective elements perform calculations according to equation (3). Therefore, a total of 6125 operation outputs $S^b_i$ (i=1 to 6125) are obtained from the elements of the sensor arrays 36 simultaneously.

The calculations for the sum of products described above are simultaneously performed by the operation units 22-0 to 22-2 in units of digits b (0 to 2). Operation results each consisting of 6125 components in each digit are serially output one by one. Alternatively, outputs are parallel-output at a time. If needed, the outputs are corrected by calibrators 38-0 to 38-2 so as to eliminate differences between the operation units 22-0 to 22-2 and between sensor outputs with in each unit with respect to the radiant brightness of the display and reception sensitivity of the sensor array 35.

Digit outputs $S^0$, $S^1$, $S^2$ of the calibrators 38-0 to 38-2 are supplied to one of power-of-16 scaling summers 40 and are digit-weighted, i.e., multiplied with $16^{-b}$ (1, 1/16, 1/256) and are summed up. Therefore, the matrix operation components $Y_i$ (i=1 to 6125) of equation (4) can be obtained as analog values from one of the scaling summers 40.

In the embodiment of FIG. 1, 6125 component operation outputs $S^b_i$ from each of the operation units 22-0 to 22-2 are output in a form of (e.g., seven) parallel data. Therefore, the n parallel outputs are processed at a time in n power-of-16 scaling summers 40-1 to 40-n.

The outputs $(Y_i)_1$ to $(Y_i)_n$ from the power-of-16 scaling summers 40-1 to 40-n are converted by A/D converters 42-1 to 42-n into digital values. The digital values are stored in the ith order of data array of digital data in an output data buffer 50. The stored data is then transferred as the operation results to a computer or the like.

Each circuit component of the operation units 22-0 to 22-2 will be described in detail.

Figure 3:
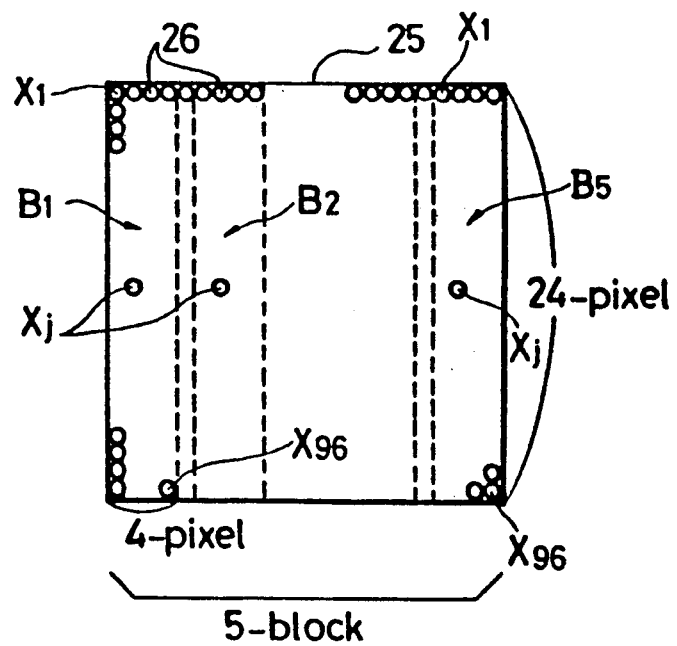
FIG. 3 is a front view of a display in the optical unit.

The display 25 has a two-dimensional arrangement of pixels 26 constituting 24 rows and 24 columns, as shown in FIG. 3. The radiant luminance of one pixel 26 represents an analog value or a gradation value of one component $X_j$ of the input vector. A block B consisting of 96 pixels 26 arranged in a matrix of 24 rows and 4 columns is used to display the components $X_1$ to $X_{96}$ of one vector. The 24 pixels 26 of 24 rows and one column between the blocks B are used to separate the vectors.

More specifically, five blocks $B_1$ to $B_5$ are formed in one display 25. Identical vector images are simultaneously displayed in these blocks. The display 25 assigned to one digit and included in each of the operation units 22-0 to 22-2 displays five identical vector images at a time. The pixels 26 of the display 25 need not be arranged in a square shape. The number of blocks may be 5 or more, e.g., 10 in a rectangular shape.

The display 25 requires a scattering light source such as an LED array or a CRT. In order to stabilize the pixel positions, the LED array is preferable because the pixel positions are mechanically fixed therein.

Figure 4:
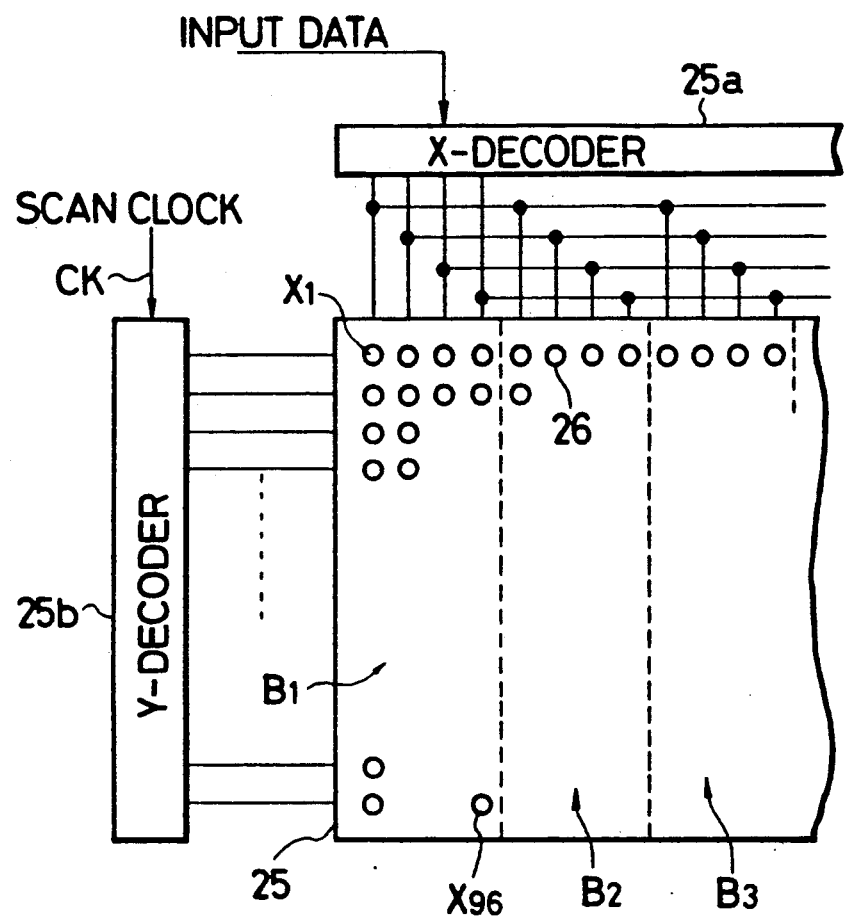
FIG. 4 is a diagram showing a drive circuit for an LED array as a typical arrangement of the display.

When the display 25 is constituted by the LED array, a dynamic turn-on system shown in FIG. 4 is preferable to simplify the arrangement of the drive circuit. In the arrangement of FIG. 4, every four parallel data from an X-decoder 25a are supplied to the pixels 26 of four columns (e.g., LED anodes) in the X direction. A Y-decoder 25b sequentially selects the pixels 26 of 24 rows (e.g., LED cathodes). As the identical vector images are displayed in the five blocks $B_1$ to $B_5$ in the X direction, the corresponding columns of the blocks are commonly connected to supply the same data from the X-decoder 25a.

Figure 5:
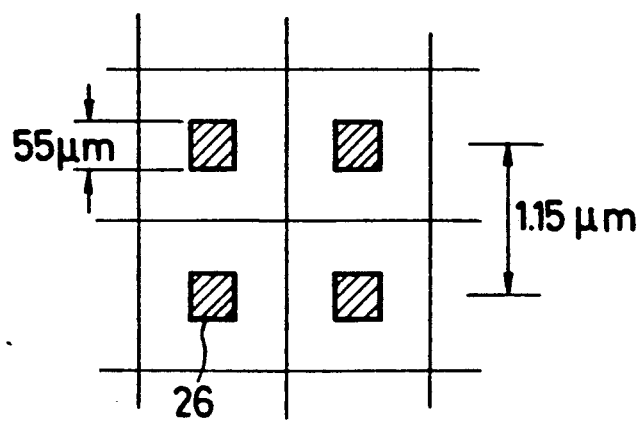
FIG. 5 is a detailed view showing the main part of the LED array.

Each pixel 26 constituted by the LED array has an area of 55μm square and the pixels are arranged at a pitch of 1.15 mm, as shown in FIG. 5. Therefore, the area of the display 25 is 27.6 mm square.

A static system can be employed in stead of the dynamic turn-on system. In this case, the pixels 26 are simultaneously energized by 96 drive elements.

As shown in FIG. 2, a projection lens 27 opposes the display 25 and is spaced apart therefrom by a focal length (about 84.9 mm) of the lens 27. A lens array 28 such as a gradient index lens is arranged on the output side of the lens 27.

The lens array 28 includes lenses 31 arranged in a square matrix of 35 rows and 35 columns. 1225 identical images each of which are the same as that formed on the display 25 are formed on the focal plane of the lens array 28. The lens 27 and the lenses 28 constitute the replication optical system 30.

Since five identical vectors are simultaneously displayed on one display 25, the number of identical input vector images formed on the focal plane of the lens array 28 is 6125. This number corresponds to that of the row components i of the matrix M.

Figure 6:
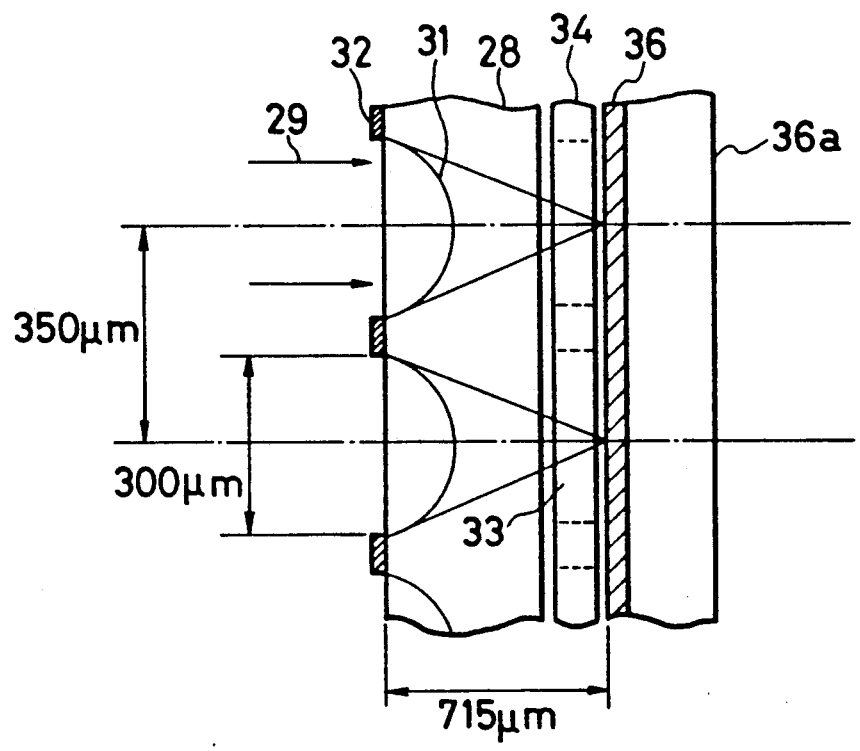
FIG. 6 is a detailed view showing the main part of an optical system.

As shown in an enlarged view of the main optical part in FIG. 6, the lens array 28 is constituted by gradient index lenses 31 which are arranged a at pitch of 350 μm and each of which has a diameter of about 300 μm and a focal length of about 715 μm. Light-shielding layers 32 are formed between the adjacent lenses, so that images formed by the lenses 31 can be optically separated from each other. The mask array 34 is arranged in front of the lens array 28 along the optical axis. Light 29 incident on each lens 31 is focused on the sensor array 36 through the mask array 34.

A reduction factor of an image by the lenses 27 and 31 is 0.00842, and each pixel 26 formed on the focal plane of the lens array 28 has an area of about 4 μm square, and an image formed on the same plane has an area of about 230 μm square.

The mask array 34 has a two-dimensional arrangement of 96×6125 masks 33 for transmitting and modulating light rays from the pixels 26. One of the masks 33 correspond to one of the components of the input vector images, respectively. The mask array 34 in each of the operation units 22-0 to 22-2 constitutes components $M^b_{ij}$ of 6125 rows and 96 columns. The masks 33 corresponding to the matrix components $M^b_{ij}$ transmit and modulate the light rays from the pixels 26 in accordance with a digit values in 16-scale of the matrix components. As to the index j (column), positions of the components $M^b_{ij}$ display positions of $X_j$-component of the input vector on the display 25.

Figure 7:
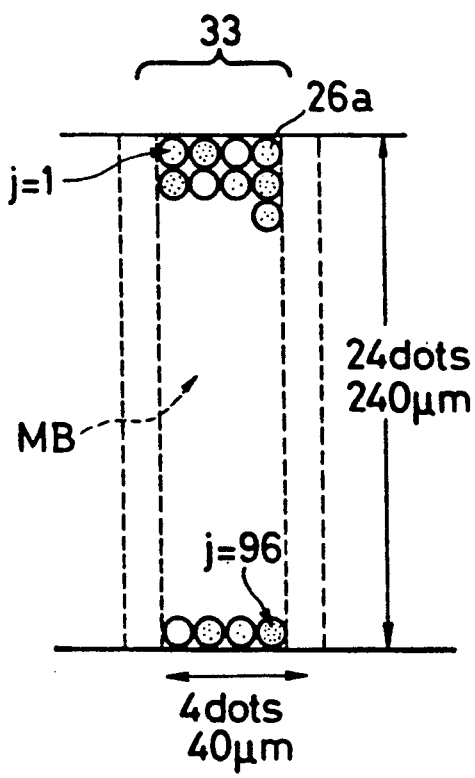
FIG. 7 is a detailed view showing a mask array.

A one-row segment of the mask array 34 corresponds to one block MB consisting of 4-column, 24-row (96-element) masks 33 each having 16-scale (16-level) transmittance, as shown in FIG. 7. The block MB has a size of 40 μm×240 μm and has similar figure to one of the blocks $B_1$ to $B_5$ (FIG. 3) of the display 25 shown in FIG. 3. Image light of an input vector consisting of 96 pixels is projected on one mask block MB. An image 26a of each pixel 26 on the display 25 is focused to form a spot having diameter of about 4 μm at the center of the mask 33 having a diameter of about 10 μm.

Figure 8:
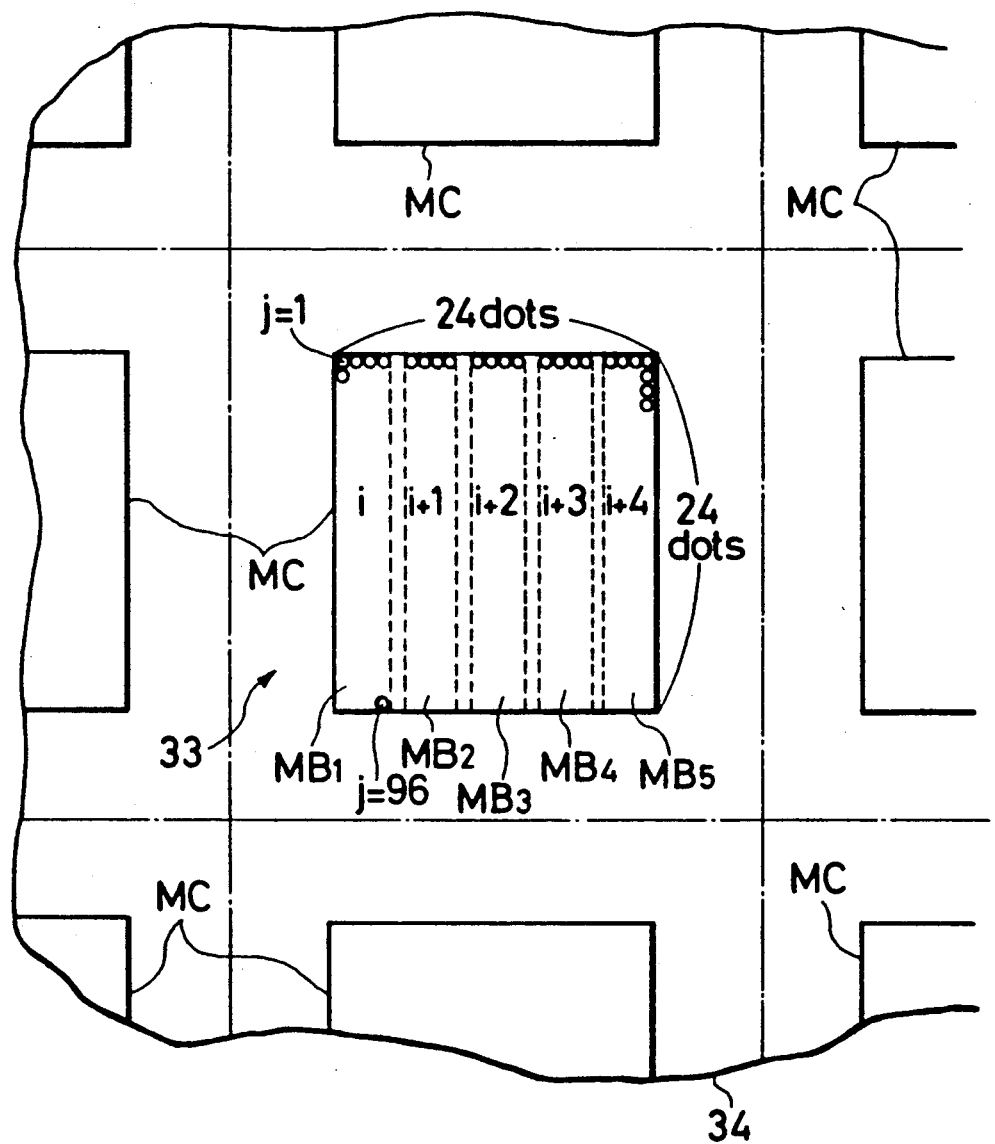
FIG. 8 is a view showing an arrangement of the mask array.

As shown in FIG. 8, each of mask cells MC has an area of 240 μm square almost equal to the area of the display 25 and consists of five blocks ($MB_1$ to $MB_5$) of the mask array 34. Each cell MC comprises the mask 33 of 24 × 24 dots. One dot column every four column dots serves as a separation range between the blocks in the same manner as in the display 25. Consecutive row numbers i, i+1, i+2, i+3, and i+4 of the matrix components $M_{ij}$ can be assigned to the blocks $MB_1$ to $MB_5$ of the matrix cell MC, respectively. Five identical vector images are simultaneously projected from the display 25 to the blocks $MB_1$ to $MB_5$.

One square mask cell MC corresponds to one lens 31 of the lens array 28. The mask cells MC of 35 rows and 35 columns complete the mask array 34. 6125 blocks MB are arranged in correspondence of the rows of the matrix M, and 6125 identical input vector image light rays are incident on the 6125 blocks MB, respectively. Therefore, 6125-row multiplications each producing a sum of products between the matrix components $M_{ij}^b$ (j=1 to 96) of 96 columns and the input vector components $X_j$ (j=1 to 96) are simultaneously performed.

Since the mask 33 has only 16-scale gradation, the mask array 34 can be easily manufactured with a normal silver halide photography process. An lithography process such as evapolation/masking/etching used in semiconductor manufacturing can be applied to the mask array 34. A evaporation layer, for example, can be employed for the mask layer, thickness or opening area of which can be controlled in proportion to 16-scale gradation. The layer may be formed directly on the photosensor array 36 which is formed on a semiconductor substrate with a process such as diffusion. Etching process can be incorporated with the control the thickness or opening area.

As shown in FIG. 6, the sensor array 36 having photosensor elements 35, the number of which corresponds to the number of input vector component images, is in tight contact with the mask array 34 on the side opposite to the lens array 28 of the mask array 34.

Figure 9:
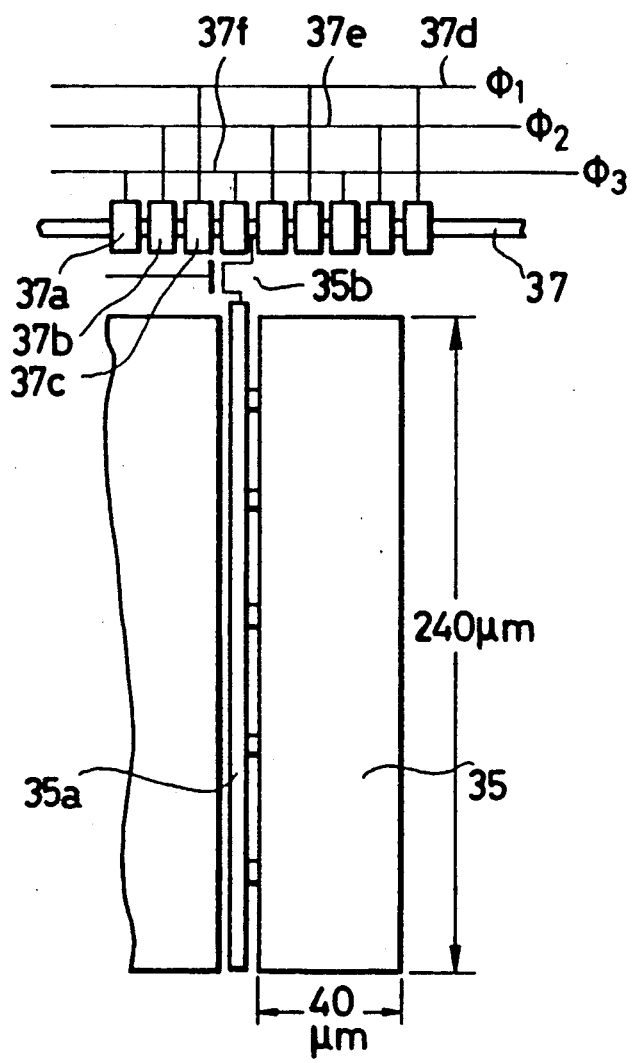
FIG. 9 is a detailed view showing an photosensor element.
Figure 10:
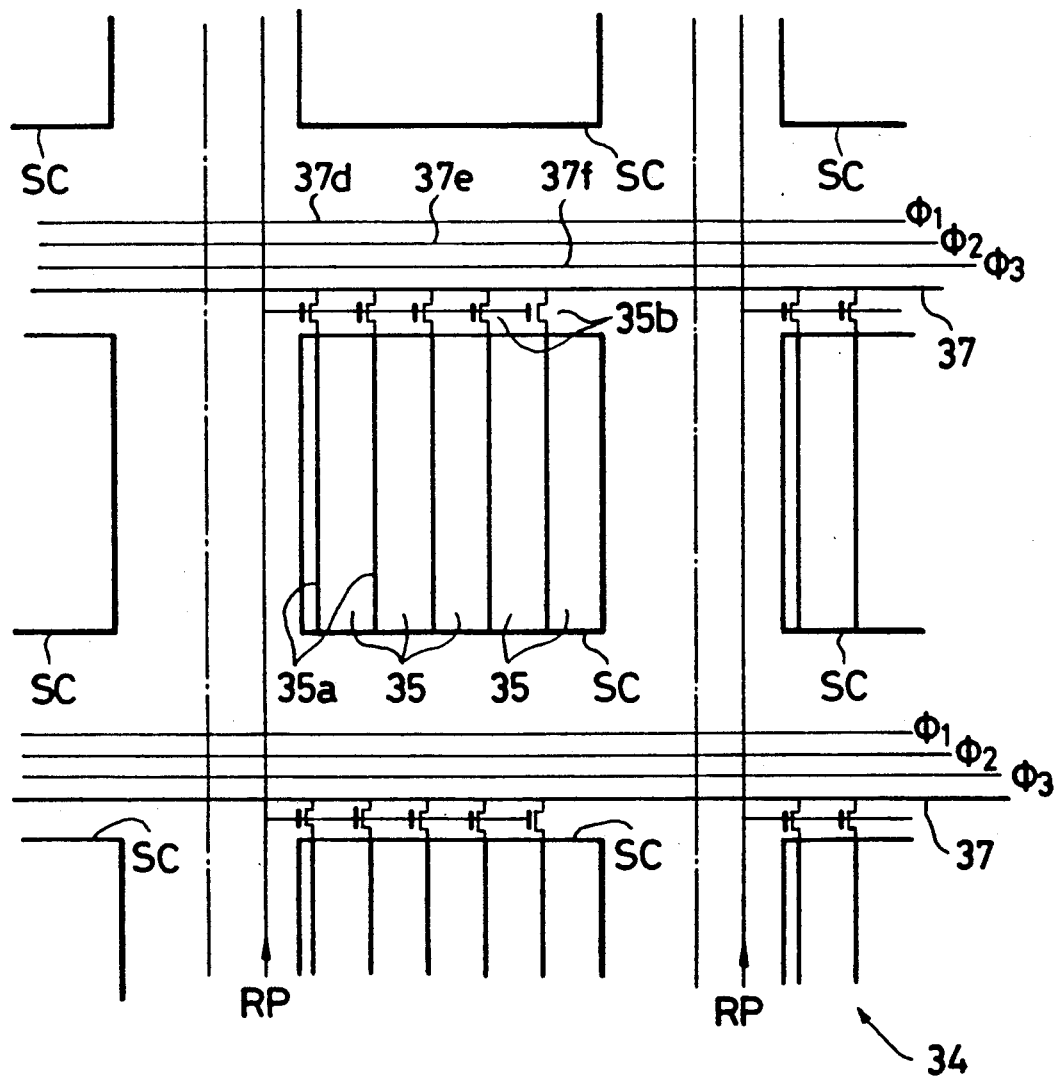
FIG. 10 is a view showing an arrangement of the sensor array.
Figure 11:
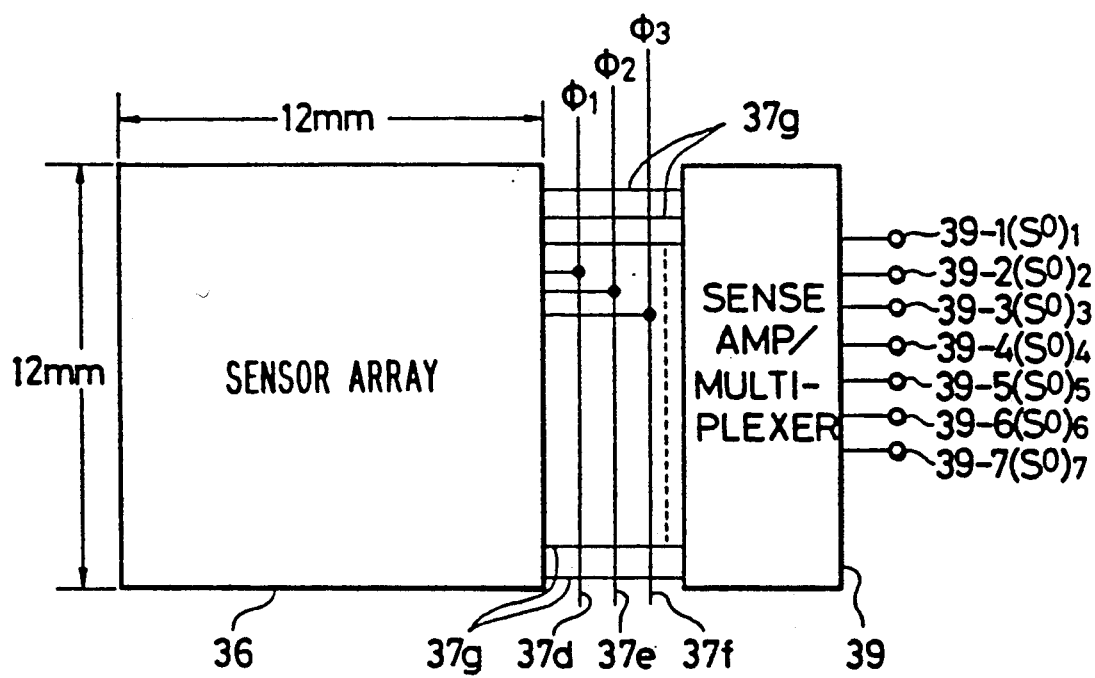
FIG. 11 is a diagram showing a circuit of the sensor array.
Figure 12:
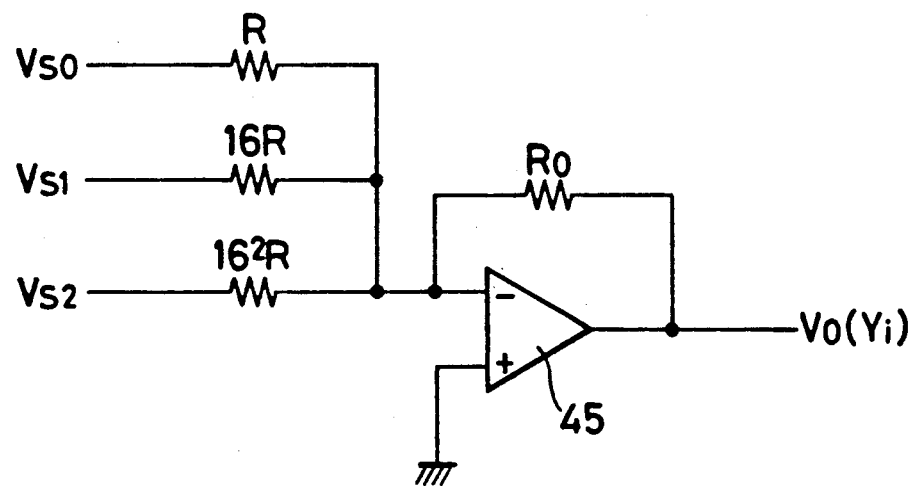
FIG. 12 is a circuit diagram of a power-of-16 scaling summer.
Figure 13:
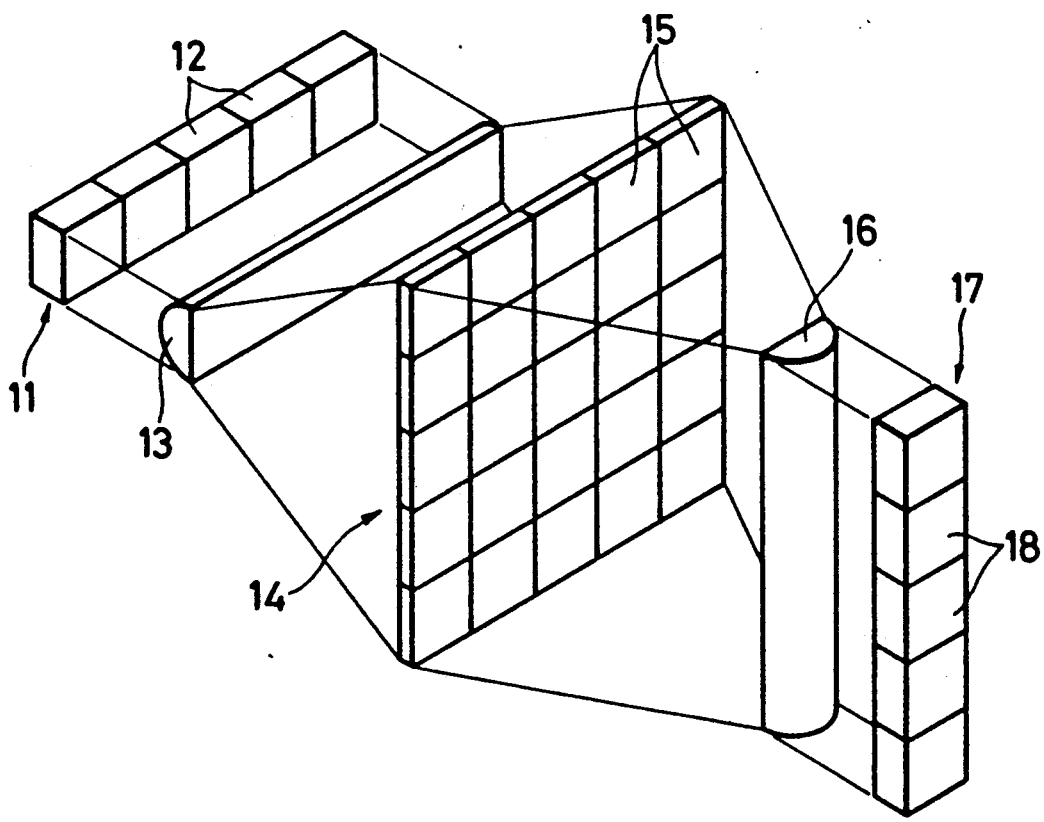
FIG. 13 is a schematic perspective view showing a conventional the technique.

All the components of one input vector image light which pass through the plurality of transmittance modification masks 33 in one block MB consisting of 96 dots are detected by one photosensor element 35. As shown in FIG. 9, one photosensor element 35 having a light-receiving area of 40 μm×240 μm is arranged in correspondence with one block MB of the mask array 34. A sensor cell SC consists of the five photosensor elements 35 and corresponds to one mask cell MC of the mask array 34, as shown in FIG. 10. The sensor cells SC of 35 rows and 35 columns are formed in the sensor array 36 so as to correspond to the mask array 34. Therefore, one sensor array 36 consists of 6125 sensor elements 35. As shown in FIG. 11, the sensor array 36 has an area of 12 mm square.

The input vector pixel images 26a passing through the mask array 34 are sequentially incident on the light-receiving surface of one photosensor element 35 by a dynamic drive for the 96 pixels 26 constituting one block B of the display 25. Charges sequentially excited on the light-receiving region of the element 35 are accumulated in a common potential well. When one scanning cycle of the display 25 in the Y direction is completed, the sums $S_i^b$ of products (equation (3)) of one row of the matrix $M^b$ and the input vector X are accumulated in one photosensor element 35.

The sums $S_i^b$ (i=1 to 6125) of products of all matrix elements and the input vector can be simultaneously obtained by the 6125 sensor elements 35 of the sensor array 36. That is, 6125 identical images of the input vector can be simultaneously projected on the blocks MB of the 6125 masks 33, so that multiplications $M^b_{ij}X_i$ of the matrix operation are performed. The light passes through the mask block MB is detected by each photosensor element 35 to perform an analog addition of the multiplication results as follows:

$$\sum_{j=1}^{96} M^b_{ij}X_h$$

The charges as the operation results accumulated by each photosensor element 35 are transferred from a read electrode 35a arranged along the longitudinal direction of the elements 35 to a horizontal CCD register 37 through a read gate 35b. Pairs of read electrode 35a and read gate 35b are arranged in each sensor element. 35 horizontal CCD registers 37 are arranged so as to correspond to the rows of the sensor array 34. Therefore, the 175 (=35× 5) sensor elements 35 belong to one CCD register 37. The 6125 read gates 35b respectively corresponding to the sensor elements 35 are simultaneously enabled by a common read-out pulse RP when a display of one vector on the display 25 is completed. 175 operation results (charges) shifted from the elements in the horizontal direction are written in one of the 35 CCD registers 37 and are linearly aligned in a lateral direction.

3-phase charge transfer electrodes 37a to 37c are arranged in the respective CCD registers 37. The charges written in the register 37 are sequentially transferred toward an output terminal in response to three-phase clocks $\phi_1$ to $\phi_3$ from clock lines 37d, 37e, and 37f.

As shown in FIG. 11, a sense amp/multiplexer 39 is connected to 35 output lines 37g connected to the output terminals of the respective CCD registers 37 of the sensor array 34. The multiplexer 39 performs 35/7-line multiplexing in this embodiment. Seven parallel outputs $(S^0)_1$ to $(S^0)_7$ are output to output terminals 39-1 to 39-7 eight hundred and seventy-five times. That is, 6125 outputs are sequentially processed in unit of seven data. The multiplexing operation can be achieved by sequentially shifting the transfer timings of the 35 CCD register 37. In principle, 35/1-line multiplexing can be performed. Alternatively, 35 parallel outputs may be generated in place of multiplexing.

The outputs $(S^0)_1$ to $(S^0)_7$ from the output terminals 39-1 to 39-7 are supplied to the calibrator 38-0 shown in FIG. 1. The calibrator 38-0 automatically corrects variations in circuit components of the display 25 and the sensor array 36 in each operation unit. For example, several photosensor element 35 is selected to calibrate the luminance of each pixel 26 of the display, and then corrects variations between the sensor elements 35 by a display of a proper reference vector. This calibration operation is automatically and periodically performed. The calibrators 38-0 to 38-2 for respective digit also correct variations in radiant luminance/reception sensitivity between the operation units 22-0 to 22-2 with reference to one of digit channel.

The seven parallel outputs from the calibrator 38-0 are distributed to the power-of-16 scaling summer 40-1 to 40-n. The power-of-16 scaling summer 40-1 simultaneously receives the output $(S^0)$, $(S^1)_1$, and $(S^2)_1$ from the operation units 22-0 to 22-2. The power-of-16 scaling summer 40-1 performs a power-of-16 scaling summation of the 3-digit input matrix operation results and outputs an analog value representing an absolute level of the matrix operation result. Other power-of-16 scaling summer 40-2 to 40-7 are simultaneously operated in the same manner as in the power-of-16 scaling summer 40-1. Each of the power-of-16 scaling summers 40-1 to 40-7 has a known circuit arrangement using an operational amplifier circuit shown in FIG. 12.

The tree digits outputs (voltage) $V_{s0}$, $V_{s1}$, $V_{s2}$ from the operation units 20-0 to 20-2 are added through resistors R, 16R, $16^2$R and then supplied to an input of an operational amplifier 45 having a feedback resistor $R_0$. Another input of the OP amp 45 is grounded so that a sum of currents flowing through the resistors R, 16R, $16^2$R is equal to a current flowing from the output to the input of amp 45 through the feedback resistor $R_0$;

$$\frac{V_0}{R_0} = \frac{V_{s0}}{R} + \frac{V_{s1}}{16R} + \frac{V_{s2}}{16^2 R}.$$

An output voltage $V_0$ is produced at the output of the amp 45 as a 16-scale 3-digit weighted sum $Y_i$ as follows:

$$V_0 = \frac{R_0}{R}\left(V_{s0} + \frac{V_{s1}}{16} + \frac{V_{s2}}{16^2}\right).$$

The present invention has exemplified by a preferable embodiment. However, various changes and modifications may be made within the spirit and scope of the invention.

In the above embodiment, five identical input vector images are displayed on the display 25. However, if the number of input vector components is large, for example, the display 25 may display a single input vector image.

In the above embodiment, in order to perform an 3-digit matrix operation, the value $S^b_i$ of each digit is multiplied with $16^{-b}$. However, the weighting $16^{-b}$ may be replaced with $16^b$.

The weighting for value $S^b_i$ with $16^{-b}$ is electrically performed in this embodiment. However, a reference transmittance of the mask array 34 may be optically attenuated in unit of $16^{-b}$ so as to achieve digit weighting for the operation units 22-0 to 22-2. Alternatively, a reference radiant luminance of the display 25 may be attenuated to achieve digit weighting for the operation units 22-0 to 22-2. In such a case, the power-of-16 scaling summers 40-1 to 40-7 may be replaced with simple adders.

In order to perform a 16-scale, 3-digit matrix operation, the embodiment includes tree operation unit 22-0 to 22-2. Calculations in one digit may be performed by two or more operation units to reduce the number of scale to be assigned to one unit. In a case of 16-scale, 3-digit operation, two operation units may be employed to process an upper 8-level part and a lower 8-level part in one digit. The output from two parts may be electrically added by binary-weighting and then added to other two digit outputs by 16-scale digit weighting. Six operation units, in this modification, will be employed to process 16-scale, 3-digit matrix components.

In the above embodiment, the sensor array 36 is exemplified by a CCD image sensor. However, the sensor array 36 may be constituted by a MOS image sensor using photodiodes and MOS transistors.

The component $M^b_{ij}$ of the mask array 34 has transmittance proportional to a positive 16-scale value. However, if a proper constant is subtracted from each component $M^b_{ij}$, a negative value expression may be utilized to perform a negative matrix operation.

This is given by the following mathematical expression:

$$\{Y\} = \{[M] - [K_1]\}[X]$$

In order to perform calculations given by the above expression, a value proportional to $$\sum_j X_j$$

can be electrically subtracted.

The value proportional to $\Sigma X_j$ can be produced from a sensor cell block SC corresponding to an additional transparent mask block MB provided to a mask cell MC, which receives radiant luminance from displayed vectors X.

According to another practical method of performing a negative matrix operation, a mask array 34 for transmitting light through only the positive components $M_{ij}$ and a mask array 34 for transmitting light through only the negative components $M_{ij}$ are used to obtain $$\sum_j M_{ij} X_j$$

values for respective polarities. The negative $M_{ij}X_j$ value is polarity-inverted, and the inverted value is added to the positive $M_{ij}X_j$ value.

Additions/subtractions of a constant can be electrically performed. When the addition of the component to the constant is performed and a negative constant is used, the following general matrix operation can be performed.

$$[Y] = \{[M] - [K_1]\}[X] + [C] - [K_2]$$
$$= [N][X] + [D]$$
$$N_{ij} = M_{ij} - K_1$$
$$D_{ij} = C_{ij} - K_2$$

The sign, i.e., negative or positive polarity of the component $M_{ij}$ is predetermined, and the component $X_j$ has only a positive value. However, the zero level of the electrical operation output may be properly shifted to perform calculations including a negative component $X_j$ in accordance with the general matrix operation.

In the above embodiment, the transmittance of the mask 33 is fixed. However, the mask 33 may be constituted by a spatial light modulation device. In this case, the transmittance of each mask 33 is fixed during calculations of one matrix, and is updated during calculations for other matrices.

In the matrix operation apparatus according to the present invention, calculations between the input vector and the rows or columns of the matrix can be simultaneously performed through parallel operation channels. In addition, replication of the input vector image for parallel processing can be simultaneously performed. The multiplications and summations of the input vector and the rows or columns of the matrix are simultaneously performed. Consequently, even if the number of components of a matrix is very large, parallel operations between the components of the vector and the matrix can be performed at high speed. In addition, perfect parallel channel formation can be achieved, and time-sequential processing can be eliminated. The transmittance of the mask need not be dynamically changed during calculations.

Calculations are performed in every units assigned to different digits of the multi-scale, multi-digit components of the matrix. Gradation scale of the optical mask array can be reduced by the division into parallel optical channels for digit segments. Intensity of operational light passing through one optical channel can be increased, resulting in a wide dynamic range and high precision operation.

The transmittance of the mask need not be dynamically changed during calculations. Therefore, a mechanism for dynamically changing the transmittance need not be used, and a compact apparatus can be obtained.

What is claimed is:

1. A matrix-vector multiplication apparatus for performing multiplications between an input vector and a matrix, comprising:
   parallel operation units each assigned to each digit of a multi-scale, multi-digit code representing a component of the matrix, and summing means for combining outputs from said parallel operation units,
   each of said parallel operation units including:
   a display for displaying a plurality of components constituting the vector to produce a radiant image pattern,
   a replication optical system for optically replicating a vector image displayed on said display into multiple images, the number of which images corresponds to the number of rows of the matrix;
   a mask array comprising multilevel transmission elements each having transmittance proportional to one digit value of each matrix component, said transmission elements producing products between the components of the vector and the matrix when the vector image radiance passes through the mask array; and
   photosensors each of which is arranged to detect an intensity of light of each replicated vector image having passed through said mask array and sum up the products to produce one digit value of a multiplication operation,
   said summing means producing a digit-weighted sum of all digits outputs from said operation units to produce a component of an output vector.

2. An apparatus according to claim 1, wherein said mask array comprises a two-dimentional array consisting of a non-column components of the matrix which corresponds to one vector image, end rows components of the matrix, the number of which rows corresponds to the number of the replicated vector images.

3. An apparatus according to claim 1 or 2, wherein said display has a pixel matrix having pixels, the number of which pixels corresponds to the number of components of the vector, an intensity of each pixel represents a magnitude of each component of the vector.

4. An apparatus according to claim 3, wherein the number of pixels of said display is an integer multiple of the number of components of the vector in order to display a plurality of identical vector images.

5. An apparatus according to claim 3 wherein said display comprises a dynamic display for performing display and scanning in a direction of rows or columns of the pixel matrix.

6. An apparatus according to claim 1 or 2, wherein said mask array comprises a spatial light modulation device capable of changing in different matrices a light in proportion to multi-scale value of the matrix components.

7. An apparatus according to claim 1, wherein said replication optical system comprises a single convex lens spaced apart from said display by a focal length of said single convex lens, and a plurality of lenses arranged on a convex lens side opposite to said display such that optical axes of said plurality of lenses are parallel to an optical axis of said convex lens.

8. An apparatus according to claim 1, wherein said summing means comprises a power-of-m scaling summer for receiving parallel outputs from said operation units corresponding to respective digits, performs power-of-m scaling summation, where m is gradation scale of the multi-scale code, and outputs analog components of the 9. An apparatus according to claim 1, wherein said display of said each parallel operation unit has a reduced reference radiant intensity corresponding to power-of-m scaling assigned to said each parallel operation unit, where m is gradation scale of the multi-scale code, and said summing means comprises a simple adder which does not perform power-of-m scaling.

10. An apparatus according to claim 1, wherein said mask array of said each parallel operation unit has a reduced reference light transmittance corresponding to power-of-m scaling assigned to said each parallel operation unit, where m is gradation scale of the multi-scale code, and said summing means comprises a simple adder which does not perform power-of-m scaling.

11. An apparatus according to claim 1, wherein at least one of said photosensors comprises a sensor element array having sensor elements, the number of which sensor elements corresponds to the number of the replicated vector images, a plurality of register means for transferring a received charge of said elements in units of columns of the element array, and a charge readout gate for controlling connections between each sensor element and a corresponding one of said plurality of register means.

12. An apparatus according to claim 11, further comprising multiplexing means for supplying outputs from said plurality of register means to parallel output terminals, the number of which output terminals is smaller than the number of said register means.

13. An apparatus according to claim 12, said summing means for adding the outputs from said parallel operation units comprises a plurality of summers, the number of which summers is equal to the number of parallel outputs from said each parallel operation unit, and which output a plurality of parallel output vector components.

* * * * *